(No Model.)
M. FLAMMANG.
STAND FOR PHOTOGRAPHIC CAMERAS.
No. 282,182. Patented July 31, 1883.
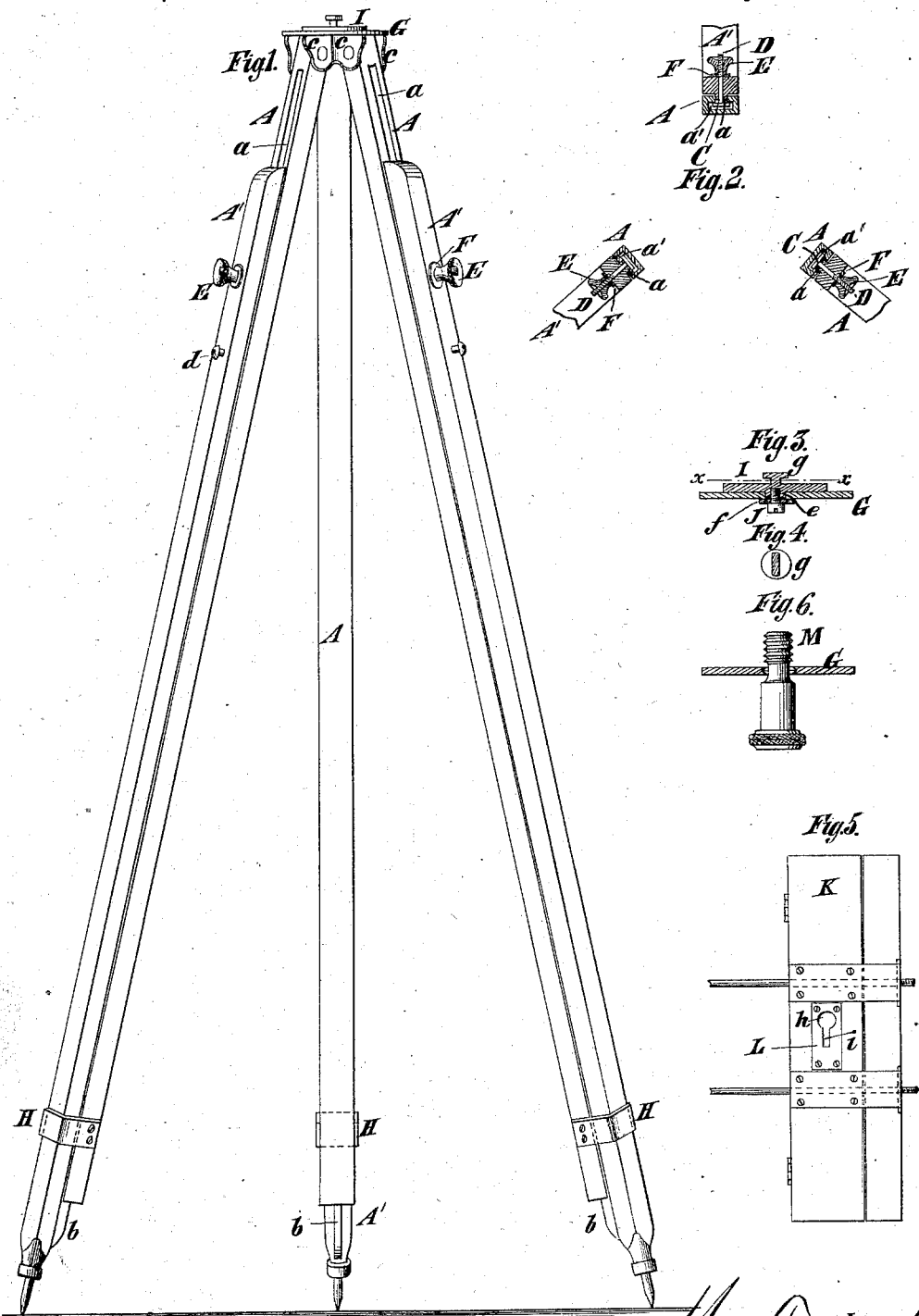

UNITED STATES PATENT OFFICE.

MATHIAS FLAMMANG, OF NEWARK, NEW JERSEY.

STAND FOR PHOTOGRAPHIC CAMERAS.

SPECIFICATION forming part of Letters Patent No. 282,182, dated July 31, 1883.

Application filed June 10, 1882. (No model.)

*To all whom it may concern:*

Be it known that I, MATHIAS FLAMMANG, of Newark, in the county of Essex and State of New Jersey, have invented a certain new and useful Improvement in Stands for Photographic Cameras and other Articles, of which the following is a specification.

The principal object of my improvement is to produce a simple and inexpensive stand for photographic cameras and like articles having no parts which need to be detached in operating it, and hence no parts which are liable to be lost.

To this end my improvement consists in the combination of a plate provided on its under side with pairs of lugs, legs severally composed of two sections, the upper of which fits between and is pivoted to a pair of lugs and which are fitted together with a tongue and groove, and means, preferably consisting of a screw, for clamping the sections together in different positions, all as hereinafter described and claimed.

The improvement also consists in the combination, in a stand, of legs severally composed of two sections, one having a longitudinal groove of T-shaped transverse section, the other having a tongue fitting in the main portion of the groove, and a metal plate fitting in the lateral extension of the groove, and a screw whereby said plate may be clamped in the lateral extension of the groove to secure the two sections in different positions.

The invention also consists in the combination, with a stand having at the top a plate pivoted in place and furnished with a button, of a photographic camera having affixed to its under side a plate provided with a hole through which the head of said button may be passed, and a slot extending from said hole and adapted to receive the shank of said button. The shank of the aforesaid button preferably has flat sides, and in such case the slot in the plate affixed to the camera fits the flat sides of the shank and prevents the camera from being turned relatively to the plate on which is the button.

In the accompanying drawings, Figure 1 is a side view of a stand embodying my improvement, the legs being extended and spread apart. Fig. 2 is a transverse section of the legs of the same. Fig. 3 is a transverse vertical section of the upper portion which serves to secure the camera in place. Fig. 4 is a horizontal section taken on the plane of the dotted line *x x*, Fig. 3. Fig. 5 is an inverted plan of a photographic camera, and Fig. 6 is a view illustrative of other means for securing a photographic camera to the stand.

Similar letters of reference designate corresponding parts in all the figures.

Each of the legs of the stand is composed of two sections, A A', which are adjustably connected together. One of the sections, in this instance the upper section, A, has a groove, *a a'*, of T-shaped cross-section, and the other section, A', has a tongue, *b*, which fits in the main portion *a* of the groove *a a'* of the section A.

C is a metal plate, which is affixed to a screw, D, that passes through the section A'. This plate fits in the portion *a'* of the groove *a a'* in the section A, and secures the two sections together. The screw D projects through the section A', and outside the same has applied to it a nut, E, which may be manipulated to cause the plate to clamp the two sections together. On loosening the nuts of the several legs the sections can be adjusted relatively to each other and again secured in position by tightening the nuts. Preferably washers F are interposed between the nuts E and the sections A' of the legs, so as to prevent the nuts from injuring the said sections. The sections A of the legs are fitted between and pivoted to pairs of lugs *c* extending from a metallic plate, G, so that the legs can be spread apart, and the sections A' have at the ends sharp pins which may be indented into the ground. The sections A near the lower end have keepers or straps H, of metal, secured to them and extending around the sections A', so as to aid in preserving the proper relations between the sections. On the sections A' are pins or screws *d*, which, when the sections A' are extended, come in contact with the keepers or straps H and prevent the said sections from being detached from the sections A.

I designates a plate pivoted to the plate G and bearing against the top thereof. As shown, it has on the under side a stud, *e*, which fits in a hole in the plate G, and which permits of the plate I being turned or rotated relatively to the plate G. This stud is secured in place by means of a screw, J, which is inserted into it from the under side of the plate G, and serves to clamp a washer, f, against the under side of said plate G, so as to retain the plate I by friction in any position into which it may be adjusted. On the upper side of the plate I is a button, g, having a circular head and a flat-sided shank.

K designates a camera of any desirable form. In the under side of the back of this camera is a recess to which is fitted a metal plate, L, having a round opening, h, of a size to permit the head of the button g to pass through it, and a straight-sided slot, i, extending from the said opening and made of a size to accommodate the flat-sided shank of the button. To lock the camera to the stand, the round opening h of the plate L is slipped over the head of the button g, and the camera is then shifted to cause the straight-sided slit to embrace the flat-sided shank of the button. The reverse action will serve to effect the detachment of the camera. When the camera is secured in place it may be turned in various directions by the movement of the stud e of the plate I within the hole in the plate G. The friction of the plate I on the plate G will serve to retain the camera in any position into which it may be adjusted.

Turning, now, to Fig. 6, M designates a screw fitting in the plate G. It is shouldered below the plate to prevent its displacement in an upward direction, and its screw-thread prevents it from being displaced in a downward direction. This screw may be used in lieu of the plate I and its appurtenances, to secure the camera to the stand and to clamp it in position.

It will be seen that in a stand embodying my improvement there are no parts which can be detached so as to be liable to be lost.

What I claim as my invention, and desire to secure by Letters Patent, is—

1. The combination of the plate G, provided on its under side with pairs of lugs c, legs severally composed of two sections, A A', the former of which fits between and is pivoted to a pair of the lugs c, and which are fitted together with tongues and grooves, and means for clamping said sections together in different positions, substantially as specified.

2. The combination, in a stand, of legs severally composed of two sections, one having a longitudinal groove of T-shaped transverse section, the other having a tongue fitting in the main portion of the groove, and a metal plate fitting in the lateral extension of the groove, and a screw whereby the said plate may be clamped in the lateral extension of the groove to secure the two sections in different positions, substantially as specified.

3. The combination, in a stand, of the legs composed of the two sections A A', having grooves and tongues a a' b, the plates C, screws D, nut E, keepers or straps H, and pins or screws d, substantially as specified.

4. The combination, with a stand having at the top a plate pivoted in place and furnished with a button, of a photographic camera having affixed to its under side a plate provided with a hole through which the head of said button may be passed, and a slot extending from said hole and adapted to receive the shank of said button, substantially as specified.

5. The combination, with a stand having at the top a plate pivoted in place and provided with a button the shank of which has flat sides, of a photographic camera having affixed to its under side a plate provided with a hole through which the head of the button may be passed, and a slot extending from said hole and adapted to receive the shank of the button and to fit the flat sides thereof, substantially as specified.

6. The combination of the stand having at the top the plate G, the plate I, pivoted to said plate G, and provided with the button g and with the clamping-screw J, whereby it may be secured against turning on the plate G, and a camera having affixed to its under side the plate L, provided with the hole h and slot i, all substantially as specified.

M. FLAMMANG.

Witnesses:
T. J. KEANE,
JAMES R. BOWEN.